(12) United States Patent
Choi

(10) Patent No.: US 12,031,893 B2
(45) Date of Patent: Jul. 9, 2024

(54) DEVICE AND METHOD FOR MEASURING TURBIDITY OF FINE PARTICLES

(71) Applicant: Fiberpia.Co., Ltd., Daejeon (KR)

(72) Inventor: Young Bok Choi, Sejong-si (KR)

( * ) Notice: Subject to any disclaimer, the term of this patent is extended or adjusted under 35 U.S.C. 154(b) by 41 days.

(21) Appl. No.: 17/748,749

(22) Filed: May 19, 2022

(65) Prior Publication Data

US 2022/0373448 A1    Nov. 24, 2022

(30) Foreign Application Priority Data

May 20, 2021  (KR) .......................... 10-2021-0064751

(51) Int. Cl.
  *G01N 15/0205*  (2024.01)
  *G01N 15/06*  (2024.01)
  *G01N 21/85*  (2006.01)

(52) U.S. Cl.
  CPC ......... *G01N 15/0211* (2013.01); *G01N 15/06* (2013.01); *G01N 21/8507* (2013.01); *G01N 2015/0687* (2013.01)

(58) Field of Classification Search
  CPC ............... G01N 15/0211; G01N 15/06; G01N 21/8507; G01N 2015/0687; G02B 6/353
  See application file for complete search history.

(56) References Cited

U.S. PATENT DOCUMENTS

| 8,822,875 | B2 * | 9/2014 | Webster | G01J 3/453 |
|  |  |  |  | 219/121.13 |
| 2004/0011975 | A1 * | 1/2004 | Nicoli | G01N 15/0227 |
|  |  |  |  | 250/574 |
| 2006/0104592 | A1 * | 5/2006 | Jenkins | G02B 6/3596 |
|  |  |  |  | 385/140 |
| 2020/0085392 | A1 * | 3/2020 | Lanza | G01N 23/041 |
| 2021/0041472 | A1 * | 2/2021 | Limbach | B01L 3/021 |

FOREIGN PATENT DOCUMENTS

| CN | 209014471 U | * 10/2018 | ............. G01N 21/64 |
| KR | 20-0377868 | 3/2005 |  |
| KR | 200377868 Y1 | * 3/2005 | ............... G02B 6/42 |

(Continued)

OTHER PUBLICATIONS

English Specification of 10-0572370.

(Continued)

*Primary Examiner* — Edmond C Lau
*Assistant Examiner* — Joshua M Carlson
(74) *Attorney, Agent, or Firm* — ANTONIO HA & U.S. PATENT, LLC

(57) ABSTRACT

According to an embodiment of the disclosure, a device for measuring a turbidity of a solution containing fine particles comprises a laser module emitting a laser beam of a predetermined wavelength band, a coupler outputting the laser beam along a first laser path and a second laser path divided from each other, a probe outputting the laser beam output along the first laser path to a container containing the solution, a light receiving element receiving, through the first laser path, the laser beam reflected or scattered by the fine particles in the solution and detecting the received laser beam, and a controller calculating the turbidity based on a strength of the laser beam detected by the light receiving element.

4 Claims, 7 Drawing Sheets

(56) References Cited

FOREIGN PATENT DOCUMENTS

| | | | |
|---|---|---|---|
| KR | 10-0572370 | 4/2006 | |
| KR | 100572370 B1 * | 4/2006 | ............ G01N 15/14 |
| KR | 10-0903628 | 6/2009 | |
| KR | 100903628 B1 * | 6/2009 | ............ G01N 15/06 |
| KR | 10-1004450 | 12/2010 | |
| KR | 10-2014-0137065 | 12/2014 | |
| WO | WO-2009065613 A1 * | 5/2009 | ......... G01N 21/0303 |

OTHER PUBLICATIONS

English Specification of 10-1004450.
English Specification of 10-2014-0137065.
English Specification of 20-0377868.
English Specification of 10-0903628.

* cited by examiner

DEVICE AND METHOD FOR MEASURING TURBIDITY OF FINE PARTICLES

CROSS-REFERENCE TO RELATED APPLICATION(S)

This application is based on and claims priority under 35 U.S.C. 119 to Korean Patent Application No. 10-2021-0064751, filed on May 20, 2021, in the Korean Intellectual Property Office, the disclosure of which is herein incorporated by reference in its entirety.

TECHNICAL FIELD

The present invention relates to a device and method for measuring the turbidity of fine particles to measure the turbidity of a solution containing cerium or a compound containing cerium.

DESCRIPTION OF RELATED ART

The description of the Discussion of Related Art section merely provides information that may be relevant to embodiments of the disclosure but should not be appreciated as necessarily constituting the prior art.

Cerium is one of the rare earth elements, has an atomic number of 58, and is denoted as Ce as its element symbol. Cerium is a silver-gray metal with a color and luster similar to that of iron, and is soft and malleable and ductile. Cerium is a very electropositive and chemically reactive metal and easily oxidizes in the air to cerium oxide (IV)($CeO_2$), and when scratched with a knife, may burn. Cerium reacts slowly with cold water and rapidly with hot water to form cerium(III) hydroxide ($CeOH)_3$) and generate hydrogen gas. Cerium is readily soluble in acids and reacts well with hydrogen, halogens, and other metals. Cerium usually has an oxidation number of 3 or 4 in compounds.

Cerium and its compounds have various applications in many industrial fields, such as metal materials, ceramics, catalysts, optical materials, and pigments, and recently spreading their use to abrasives, catalysts, semiconductors, solid oxide fuel cells, and superconducting materials, and other high-tech industries. Cerium is the most consumed rare earth element.

A cerium-based abrasive slurry containing cerium-based particles as a main component has an excellent polishing effect, and its use is rapidly expanding. The cerium-based abrasive slurry is used not only for polishing optical glass, but also for polishing glass for liquid crystal, glass for magnetic recording media, such as hard disks, and for manufacturing semiconductors in electronic circuits, such as the LSI.

The cerium-based abrasive slurry is dispersed and slurried in a suspension and used. As the particle concentration (concentration) in the cerium-based abrasive slurry increases, the material removal rate increases, and the chemical reaction layer is planarized, enhancing the surface roughness.

Currently, a cerium-based abrasive slurry is prepared according to the following process. The worker prepares an abrasive slurry having a preset concentration (e.g., 10% by weight) by mixing cerium powder, water or a dispersing agent into a container and then sufficiently dispersing them while applying ultrasonic waves. Conventionally, to prepare a cerium-based abrasive slurry containing cerium in a preset concentration, the worker adds cerium powder while observing with the naked eye or injects a certain amount of cerium powder according to a predetermined manual to adjust the concentration of the cerium-based abrasive slurry.

As such, in the method for measuring turbidity with the naked eye, the concentration of the cerium-based abrasive slurry varies depending on the worker, or the concentration of the abrasive slurry may change as the polishing task proceeds, so that the polishing rate for the workpiece may be reduced or so is the yield due to scratches.

SUMMARY

According to an embodiment of the disclosure, there is provided a device and method for measuring the turbidity of fine particles, capable of measuring the turbidity of a solution including fine particles by a laser.

However, the objects of the embodiments are not limited thereto, and other objects may also be present.

According to an embodiment of the disclosure, a device for measuring a turbidity of a solution containing fine particles comprises a laser module emitting a laser beam of a predetermined wavelength band, a coupler outputting the laser beam along a first laser path and a second laser path divided from each other, a probe outputting the laser beam output along the first laser path to a container containing the solution, a light receiving element receiving, through the first laser path, the laser beam reflected or scattered by the fine particles in the solution and detecting the received laser beam, and a controller calculating the turbidity based on a strength of the laser beam detected by the light receiving element. The controller calculates the turbidity based on a light strength obtained when using a standard solution whose turbidity value is 1 and an inverse relationship between attenuation of the light reflected by the fine particles and a concentration of the fine particles. A reflected light remover is formed in the second laser path to remove reflected light at a terminated optical fiber to reduce a measurement error due to return loss, and wherein the reflected light remover is an unterminated optical fiber wound several times.

The fine particles may include particles of cerium or a compound containing cerium.

The probe may be an angled physical contact (APC)-type probe having an emitting surface inclined at a predetermined angle with respect to a bottom surface of the container.

The laser module may output a laser beam of a wavelength band close to a water window region in which the laser beam is not absorbed by water in the solution.

The laser module may include a laser light source outputting the laser beam in a predetermined wavelength band, a thermoelectric element performing a temperature control function to cool the laser light source to a predetermined reference temperature, and a temperature sensor detecting a temperature change in the laser light source and converting the temperature change into an electrical signal to provide temperature data.

The controller may provide a thermoelectric cooler (TEC) control signal based on a predetermined reference temperature of the thermoelectric element and the temperature data provided from the temperature sensor, by proportional-integral-derivative (PID) control, generate a driving signal for driving the thermoelectric element in response to the TEC control signal, and provide the driving signal to the thermoelectric element.

According to an embodiment of the disclosure, a method for measuring a turbidity of a solution containing fine particles, by a fine particle turbidity measuring device comprises emitting a laser beam of a predetermined wavelength band, splitting the laser beam to output the laser beam to a container containing the solution while preventing other light than the laser beam reflected or scattered by the fine particles in the solution from entering a light receiving element included in the fine particle turbidity measuring device, receiving and detecting the reflected or scattered laser beam by a light receiving element included in the fine particle turbidity measuring device, and calculating the turbidity based on a light strength obtained when using a standard solution whose turbidity value is 1 and a strength of the detected laser beam.

According to the embodiments of the disclosure, it is possible to quantitatively calculate the turbidity value using a laser beam of a preset wavelength band, and to accurately prepare a cerium-based abrasive slurry with a preset concentration through the quantitative data, ensuring the production of high-quality surfaces.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the present invention may be implemented in other various forms and is not limited to the embodiments set forth herein. For clarity of the disclosure, irrelevant parts are removed from the drawings, and similar reference denotations are used to refer to similar elements throughout the specification.

In embodiments of the present invention, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

Example embodiments are described below for a better understanding of the disclosure, but the disclosure is not limited thereto. Therefore, it should be noted that any embodiment performing substantially the same function as the embodiments disclosed herein belong to the scope of the disclosure.

The components, processes, steps, or methods according to embodiments of the disclosure may be shared as long as they do not technically conflict with each other.

Hereinafter, embodiments of the present invention are described in detail with reference to the accompanying drawings.

Figure 1:
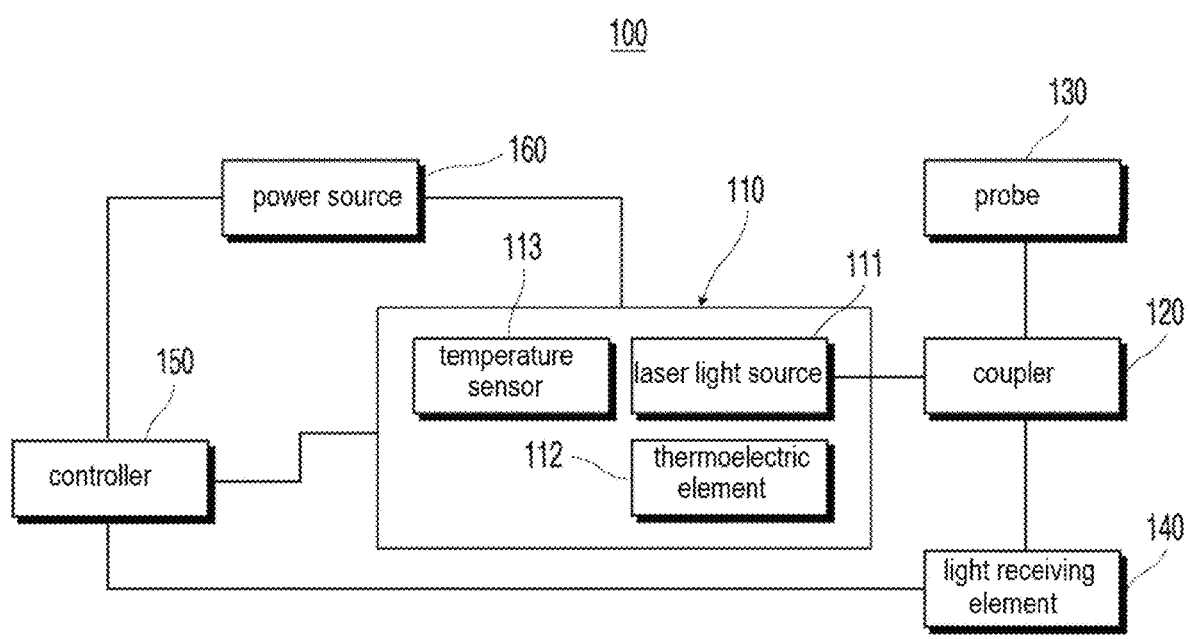
FIG. 1 is a block diagram illustrating a turbidity measuring device of fine particles according to an embodiment of the disclosure.
Figure 2:
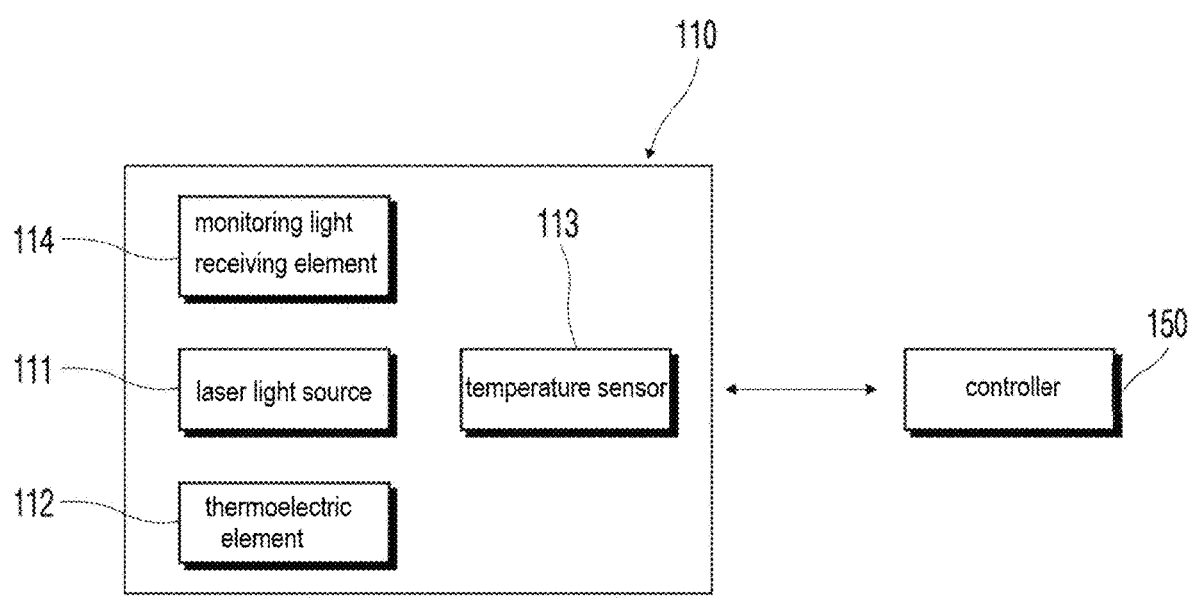
FIG. 2 is a view illustrating a configuration of a laser module according to an embodiment of the disclosure.
Figure 3:
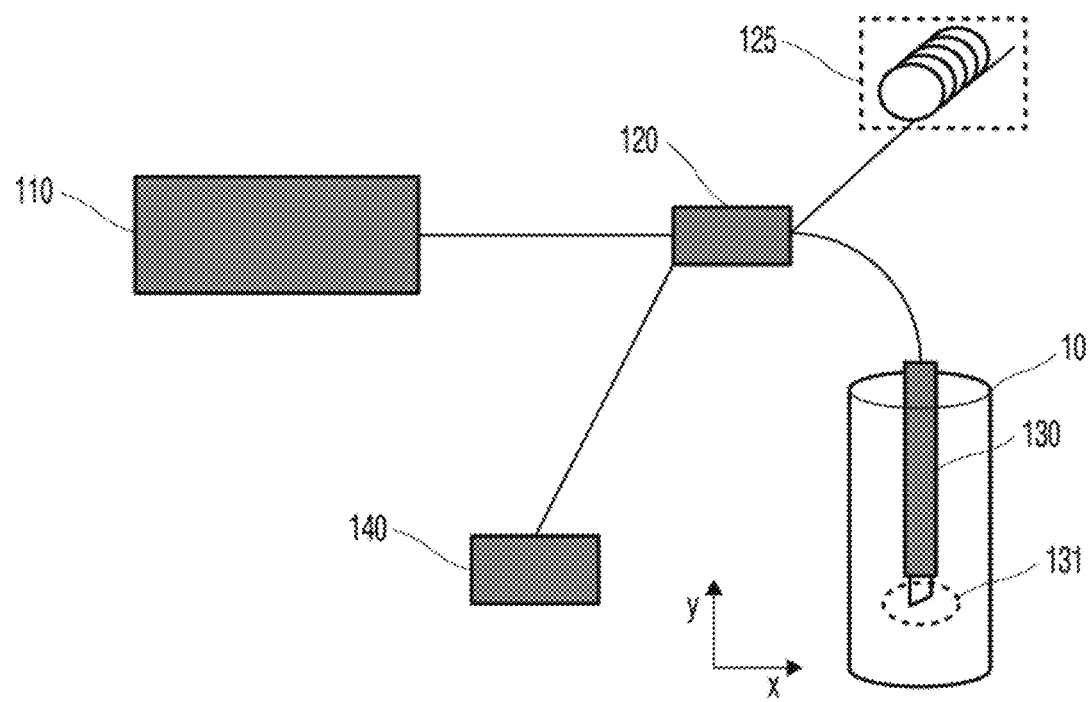
FIG. 3 is a view illustrating a turbidity measurement principle of a turbidity measuring device of fine particles according to an embodiment of the disclosure.

FIG. 1 is a block diagram illustrating a turbidity measuring device of fine particles according to an embodiment of the disclosure. FIG. 2 is a view illustrating a configuration of a laser module according to an embodiment of the disclosure. FIG. 3 is a view illustrating a turbidity measurement principle of a turbidity measuring device of fine particles according to an embodiment of the disclosure.

Referring to FIGS. 1 to 3, the fine particle turbidity measuring device 100 for measuring the turbidity of a solution containing fine particles may include, but is not limited to, a laser module 110, a coupler 120, a probe 130, a light receiving element 140, a controller 150, and a power source 160. Here, the fine particles may be particles of cerium or a compound containing cerium. The power source 160 may supply power necessary to operate the device 100.

The laser module 110 may be a laser, a laser device, or a laser circuit to emit a laser beam of a preset wavelength band (e.g., a 1300 nm wavelength band). The laser module 110 may include a stabilization circuit including a laser light source 111, a thermoelectric element 112, and a temperature sensor 113 to maintain a constant wavelength band and power. The laser module 110 may include a circuit protection resistor having a preset resistance to prevent short circuit due to overcurrent, and as the circuit protection resistor, a cement resistor, which is resistant to humidity and high temperature and is mainly used for large power, may be used.

The laser light source 111 may be implemented as a laser diode and has two electrodes 111a and 111b for operating the laser. The laser light source 111 outputs a laser beam of a wavelength band within a preset error range in a water window region where the laser beam is not absorbed by water in the solution.

The thermoelectric element 112 controls the temperature of the laser diode in a frame 115 of a predetermined size (described below with reference to FIG. 4). The thermoelectric element 112 may be implemented as a thermoelectric cooler (TEC), which enables heating and cooling on one surface according to the current flowed therethrough based on the Peltier effect. When implemented as a TEC, the thermoelectric element 112 has a high response speed and may be miniaturized.

The temperature sensor 113 may be implemented as a thermistor whose internal resistance varies depending on temperature. The thermistor is typically built in, or embedded in, the laser light source 111 and is configured to measure the temperature of the laser diode. The temperature sensor 113 may detect a change in the temperature of the laser diode, converts the temperature change into an electrical signal to generate temperature data, and provides the temperature data to the controller 150.

The controller 150 performs proportional-integral-derivative (PID) control and TEC control to keep the light output of the laser diode constant. In this case, the controller 150 may include a PID control circuit and a TEC control circuit. The PID control circuit receives the temperature data output from the temperature sensor 113 and a voltage divided from a reference voltage voltage-dropped at a fixed resistor, calculates an error using a predetermined reference temperature of the TEC, and outputs a TEC control signal. The TEC control circuit receives the TEC control signal from the PID control circuit and outputs a driving signal for TEC driving in response to the TEC control signal.

Referring to FIG. 2, the laser module 110 includes a laser light source 111, a thermoelectric element 112, a temperature sensor 113, and a light receiving element 114 for monitoring. The monitoring light receiving element 114 may be, or include, a photodetector or a photodiode.

The resistance varies depending on changes in laser output. The controller 150 may monitor the laser output based on changes in the current flowing through the monitoring light receiving element 114 and adjusts the current supplied to the laser light source 111 to emit a predetermined laser output. Accordingly, the controller 150 may perform feedback control using the monitoring light receiving element 114, so that the laser light source 111 may output a laser beam very stably.

As such, the laser module 110 may adopt any one of a type using the thermoelectric element 112 and the temperature sensor 113, a type using the monitoring light receiving element 114 disposed inside or outside the laser light source 111, or a type using all of the thermoelectric element 112, the temperature sensor 113, and the monitoring light receiving element 114. Thus, the laser module 110 may allow the laser output from the laser light source 111 to maintain constant power and wavelength band.

The coupler 120 splits the laser beam emitted from the laser module 110 into a first laser path and a second laser path. The coupler may be implemented as a 2:1 (Y-type) coupler. A return loss may occur due to the reflected light on the terminated optical fiber of the 2:1 (Y-type) coupler. The reflected light may cause an error in concentration measurement. Accordingly, as the coupler 120, a 2:2-type coupler is used as shown in FIG. 3. A probe 130 is connected to the termination of the first laser path, and a reflected light remover 125, which is an unterminated optical fiber wound several times, is formed in the second laser path to remove the return loss. The optical fiber of the reflected light remover 125 is preferably wound five or more times with a winding diameter of 3 to 7 mm or less considering the fact that the optical fiber may be broken due to stress.

The probe 130 outputs the laser beam, which is output along the first laser path via the coupler 120, to the container 10. The probe 130 outputs the laser beam to the container 10 from inside or outside the container 10 containing a solution. The body of the probe 130 may be formed of a waterproof material (e.g., stainless steel) to be inserted into the inside of the container 10, and an APC-type ferrule 131 is attached to an end of the body of the probe 130. The ferrule has an emitting surface 131, which is a surface contacting the optical fiber and is inclined at a predetermined angle (e.g., 7° to 9°) from the plane (e.g., the bottom surface of the container) and is coated with water repellent to prevent contamination due to fine particles.

The APC-type ferrule 131 allows the traveling direction of the laser beam emitted from the emitting surface of the probe 130 to be inclined at a predetermined angle from the length direction of the optical fiber.

A typical optical fiber is formed in a physical contact (PC) type, and the angle of the contact surface between optical fibers or between the optical fiber and the probe is 90° from the plane (e.g., the bottom surface of the container). In other words, the contact surface of the optical fiber has a flat structure. However, even when the optical axis of the contacting optical fiber or probe is properly aligned, light reflection may occur at the contact surface.

To reduce such reflection, the APC type ferrule is installed so that the contact surface between the optical fiber and the probe has an oblique angle, other than 90°, from the plane (e.g., the bottom surface of the container).

The light receiving element 140 detects the strength of the light (laser beam) that is reflected or scattered by the fine particles in the solution after being emitted from the tip of the probe 130.

The controller 150 calculates the turbidity value based on the strength of light detected by the light receiving element. In this case, since the degree of attenuation of the light reflected by the fine particles is inversely proportional to the concentration of the fine particles in the solution, the controller 150 may measure the turbidity value based on the light strength detected by the light receiving element 140. Since the reflected light remover 125 is formed in the second laser path, the other light than the light reflected by the fine particles may not be incident on the light receiving element 140. The turbidity value may be calculated by comparing the light strength obtained when using a standard solution whose turbidity value is 1 with the measured light strength.

Figure 4:
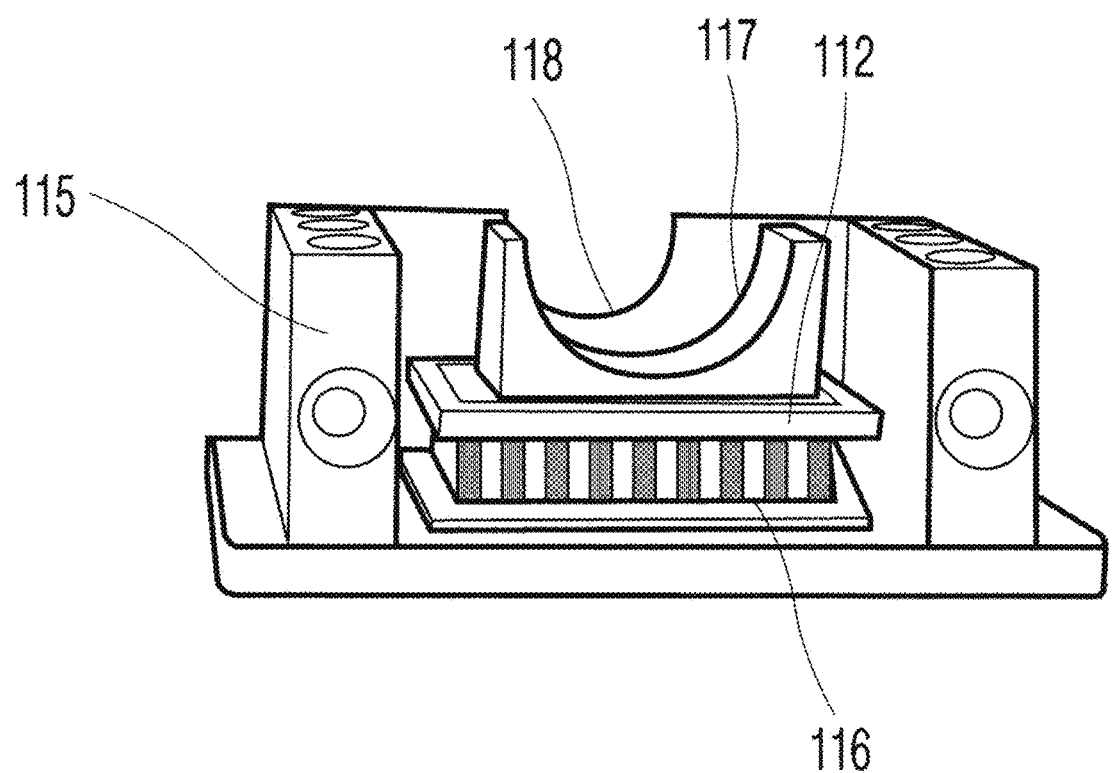
FIG. 4 is a side view illustrating a configuration of a frame where a laser module is mounted according to an embodiment of the disclosure.
Figure 5:
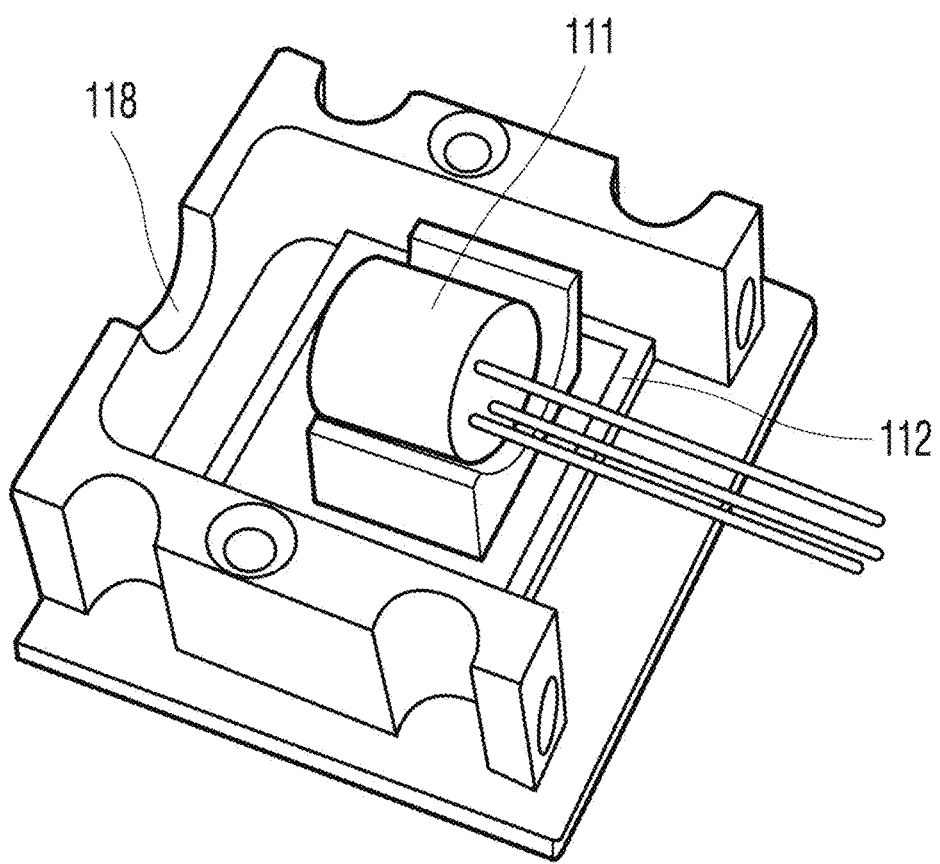
FIG. 5 is a perspective view illustrating a configuration of a frame where a laser module is mounted according to an embodiment of the disclosure.
Figure 6:
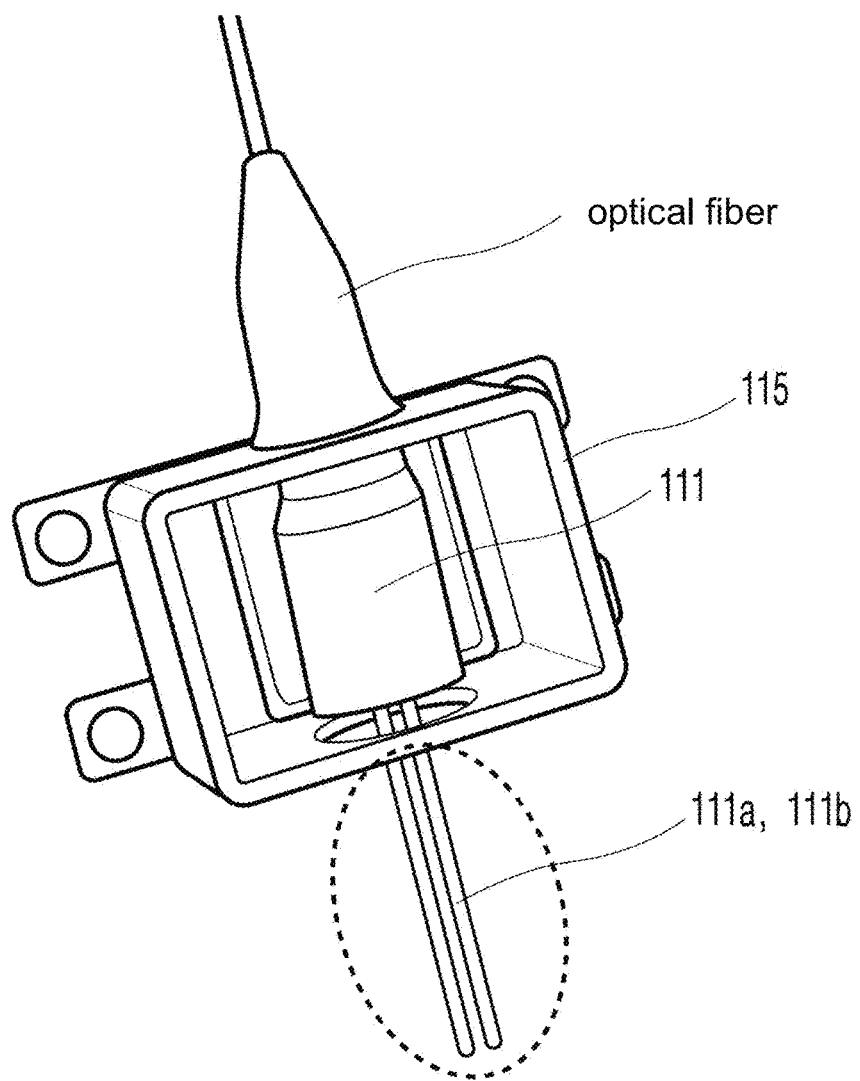
FIG. 6 is a view illustrating a connection between a laser module and an optical fiber according to an embodiment of the disclosure.

FIG. 4 is a side view illustrating a configuration of a frame where a laser module is mounted according to an embodiment of the disclosure. FIG. 5 is a perspective view illustrating a configuration of a frame where a laser module is mounted according to an embodiment of the disclosure. FIG. 6 is a view illustrating a connection between a laser module and an optical fiber according to an embodiment of the disclosure.

Referring to FIGS. 4 and 5, a frame 115 where the laser module 110 is mounted may include a heat sink 116 installed under the thermoelectric element 112, a fixing part 117 for fixing the laser light source 111 onto the thermoelectric element 112, and a connecting part 118 for connecting with the optical fiber on the path where the laser beam of the laser light source 111 is output.

In this case, the frame 115 includes a space for placing the temperature sensor 113 in a space on one side of the fixing part 117. The fixing part 117 and the connecting part 118 may be positioned on the same axis and be formed into a concave rounded shape (U-shape) for seating the laser diode and the pigtailed optical fiber.

Referring to FIG. 6, the optical fiber and the laser light source 111 are connected to each other by a pigtail. As such, the laser module 110 connected with the thermoelectric element 112 has very low insertion loss, connection of the APC-type probe 130 or optical fiber is easy, and aligning issues arising between the optical fiber and the laser diode may be addressed.

To cool the high heat-generative laser diode in a narrow space, the thermoelectric element 112 in the laser module 110 is implemented as a thermoelectric cooler (TEC) and, considering TEC efficiency, the heat sink 116 is included to effectively dissipate heat to the outside.

As such, since the optical fiber and the laser light source 111 are pigtailed to each other and mounted on the frame 115, connection between the frame 115 and the optical fiber is easy. Further, without an expensive butterfly-type laser diode as conventional, temperature control is performed using the thermoelectric element 112 and the temperature sensor 113. Thus, the laser light source 111 may be configured at a low cost as compared with the butterfly-type laser diode, while stably outputting laser beams.

Figure 7:
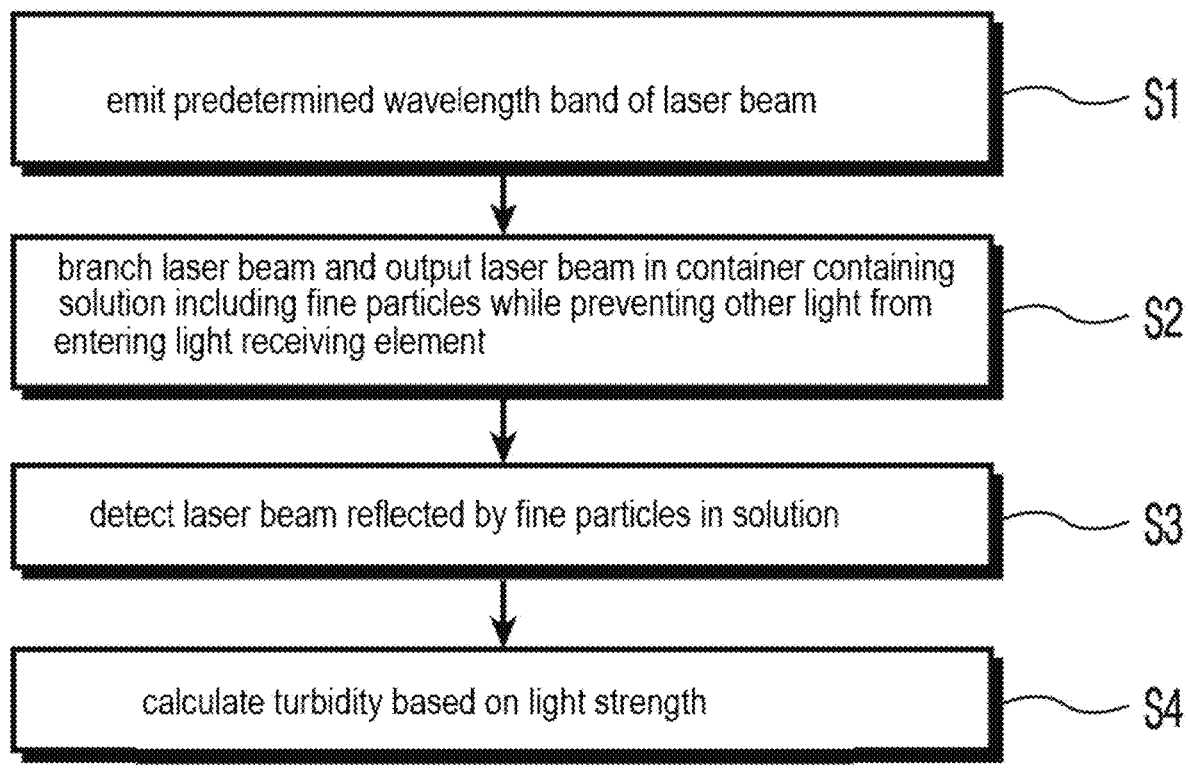
FIG. 7 is a flowchart illustrating a method for measuring the turbidity of fine particles according to an embodiment of the disclosure.

FIG. 7 is a flowchart illustrating a method for measuring the turbidity of fine particles according to an embodiment of the disclosure.

Referring to FIG. 7, the laser module 110 emits a predetermined wavelength band of laser beam (S1). The coupler 120 branches the emitted laser beam into the first laser path and the second laser path, outputs the laser beam, through the first laser path, to the container, which contains a solution in which water and cerium or cerium compound (fine particles) are mixed, via the ferrule installed at one end of the probe 130, while preventing other light than the light (laser beam) reflected by the fine particles from entering the light receiving element 140 (S2).

The light receiving element 140 receives and detects the light reflected by the fine particles in the solution, from the coupler 120 through the first laser path (S3). The probe 130 is formed in an APC type to receive only the light reflected by the fine particles and is coated with water repellent.

In other words, the coupler 120 transfers the laser beam output from the laser module 110 through the first laser path and receives, from the probe 130, the light reflected by the fine particles and delivers the received light to the light receiving element 140. The reflected light remover 125 is formed in the second laser path to prevent light other than the light reflected by the fine particles from entering the light receiving element 140. The light receiving element 140 detects the strength of the light reflected by the fine particles.

The controller 150 calculates the current turbidity value in the container using the light strength detected by the light receiving element 140 (S4).

Steps S1 to S4 of FIG. 7 may be divided into additional sub-steps or may be combined into fewer steps according to embodiments of the disclosure. Further, some of the steps may be omitted as necessary, or the order of the steps may be changed.

The above-described embodiments may be implemented in the form of recording media including computer-executable instructions, such as program modules. The computer-readable medium may be an available medium that is accessible by a computer. The computer-readable storage medium may include a volatile medium, a non-volatile medium, a separable medium, and/or an inseparable medium. The computer-readable storage medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

Although embodiments of the present invention have been described with reference to the accompanying drawings, It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the present invention is defined by the appended claims rather than the described description of the embodiments and include all modifications or changes made to the claims or equivalents of the claims.

What is claimed is:

1. A device for measuring a turbidity of a solution containing fine particles, the device comprising:
   a laser module emitting a laser beam of a predetermined wavelength band;
   a coupler outputting the laser beam along a first laser path and a second laser path divided from each other;
   a probe outputting the laser beam output along the first laser path to a container containing the solution;
   a light receiving element receiving, through the first laser path, the laser beam reflected or scattered by the fine particles in the solution and detecting the received laser beam; and
   a controller calculating the turbidity based on a strength of the laser beam detected by the light receiving element, wherein
   the controller calculates the turbidity based on a light strength obtained when using a standard solution whose turbidity value is 1 and an inverse relationship between attenuation of the light reflected by the fine particles and a concentration of the fine particles, wherein
   a reflected light remover is formed in the second laser path to remove reflected light at a terminated optical fiber to reduce a measurement error due to return loss resulting from optical fiber connections to the coupler, and wherein the reflected light remover is an unterminated optical fiber wound several times connected to the coupler,
   wherein the probe is an angled physical contact (APC)-type probe having an emitting surface inclined at a predetermined angle with respect to a bottom surface of the container, thereby preventing light reflection at a contact surface between two optical fibers connected at the coupler or between the optical fiber and the probe,
   wherein the laser module includes: a laser light source outputting the laser beam in a predetermined wavelength band; a thermoelectric element performing a temperature control function to cool the laser light source to a predetermined reference temperature in a predetermined sized frame; and a temperature sensor detecting a temperature change in the laser light source and converting the temperature change into an electrical signal to provide temperature data,
   wherein the frame includes: a heat sink installed under the thermoelectric element; a fixing part for fixing the laser light source onto the thermoelectric element and including a space for placing the temperature sensor in a space on one side thereof; and a connecting part for connecting with the optical fiber on the path where the laser beam of the laser light source is output, and
   wherein the fixing part and the connecting part are positioned on the same axis and formed into a concave rounded shape for seating the optical fiber.

2. The device of claim 1, wherein the fine particles include particles of cerium or a compound containing cerium.

3. The device of claim 1, wherein the laser module outputs a laser beam of a wavelength band close to a water window region in which the laser beam is not absorbed by water in the solution.

4. The device of claim 1, wherein the controller provides a thermoelectric cooler (TEC) control signal based on a predetermined reference temperature of the thermoelectric element and the temperature data provided from the temperature sensor, by proportional-integral-derivative (PID) control, generates a driving signal for driving the thermoelectric element in response to the TEC control signal, and provides the driving signal to the thermoelectric element.

* * * * *